(No Model.)
A. VAUGHN.
TAILOR'S MEASURE.
No. 586,406. Patented July 13, 1897.
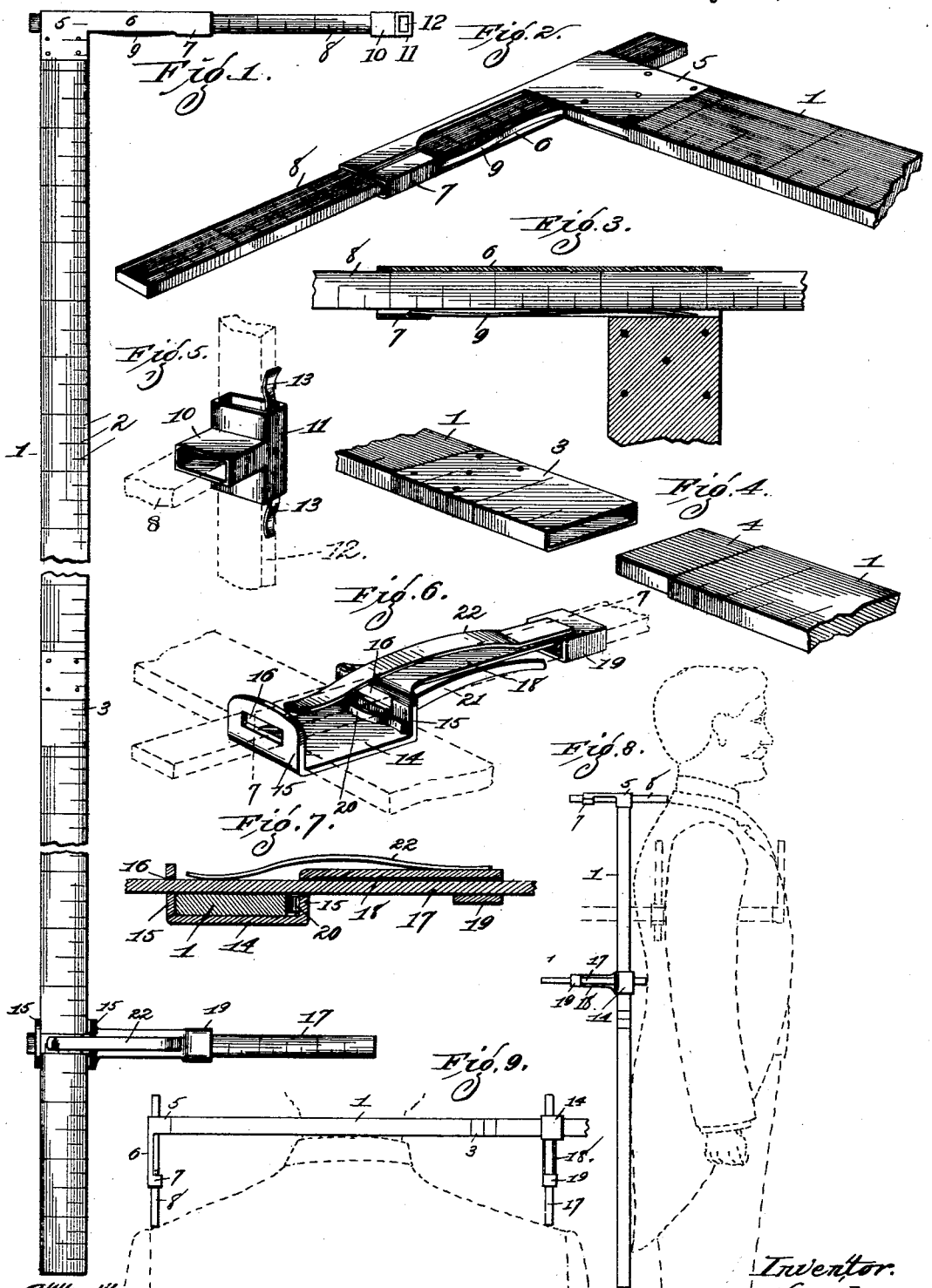
Attest
W. P. Lynch
John L. Tinnison
Inventor:
Archer Vaughn.
By Higdon & Higdon
Attys.
THE NORRIS PETERS CO., PHOTO-LITHO., WASHINGTON, D. C.

UNITED STATES PATENT OFFICE.

ARCHER VAUGHN, OF CARROLLTON, MISSOURI, ASSIGNOR OF ONE-HALF TO JOHN C. NAPIER, OF ST. LOUIS, MISSOURI.

TAILOR'S MEASURE.

SPECIFICATION forming part of Letters Patent No. 586,406, dated July 13, 1897.

Application filed February 6, 1896. Renewed June 3, 1897. Serial No. 639,330. (No model.)

*To all whom it may concern:*

Be it known that I, ARCHER VAUGHN, of the city of Carrollton, Carroll county, State of Missouri, have invented certain new and useful Improvements in Tailors' Measures, of which the following is a full, clear, and exact description, reference being had to the accompanying drawings, forming a part hereof.

My invention relates to an improved tailor's measure; and it consists in the novel construction, combination, and arrangement of parts hereinafter described and claimed.

In the drawings, Figure 1 is a side elevation of my improved measure. Fig. 2 is a view in perspective of the head or upper end thereof. Fig. 3 is a horizontal sectional view of that portion of the measure seen in Fig. 2. Fig. 4 is a view in perspective of the joint made use of in my improved measure. Fig. 5 is a view in perspective of a socket used in carrying out my invention. Fig. 6 is a view in perspective of a slide carried upon the main member of my improved measure. Fig. 7 is a sectional view taken approximately on the indicated line 7 7 of Fig. 6. Figs. 8 and 9 are views showing the manner in which my improved measure is put to practical use.

Referring by numerals to the accompanying drawings, 1 indicates the main member of my improved measure, the same being of any length desired in the form of a straight-edge and provided on its sides with equidistant lines of demarcation, such as 2, similar to the division-marks on an ordinary ruler or scale. The member 1 may be made in sections, if desired, said sections being held together by the form of joint seen in Fig. 4, there being a rectangular socket 3 located upon the end of one of the sections, the end of the adjoining section being provided with a tongue 4, which enters the open end of the socket 3. By thus forming the main member in sections the same can be unjointed while being packed and transported.

A metallic housing 5 is rigidly fixed upon the upper or head end of the member 1, said housing being provided with a laterally-projecting portion 6, the same extending at a right angle to the member 1, and the outer end of the projecting portion 6 is formed into a rectangular bearing 7. Arranged to slide in this bearing 7 and in the upper end of the housing 5 is a measuring member 8, the same being in the form of a straight-edge having equidistant division-marks upon its side faces, said measuring member 8 being much shorter than is the main member 1. Fixed to the bearing 7 is one end of a leaf-spring 9, the free end of which passes into the upper end of the housing 5 and bears directly upon the edge of the measuring member 8. This spring, bearing directly upon said measuring member, offers the proper frictional resistance to said member as the same is moved through its bearings.

A rectangular metallic socket 10 is formed of such size as that it may readily be located upon one end of the member 8, the outer end of said socket 10 carrying a rectangular casing 11, the same being arranged at right angles to said socket 10, and through said casing is arranged to slide a measuring member 12, identical in form and size with the member 8.

A leaf-spring 13, fixed to the inside of the casing 11, bears at its ends upon the edge of said measuring member 12 and offers frictional resistance to the movement of said member through said casing.

14 indicates a plate having its ends 15 bent upwardly at right angles to the main body portion of said plate, said plate 14 being constructed of such size as that it will readily slide upon the main member 1 of my improved device. Formed in the upwardly-bent ends 15 of said plate are rectangular apertures 16, through which operates a measuring member 17, identical in form and size with the measuring members 8 and 12, previously described.

Formed integral with the upper end of one of the upturned portions 15 of the plate 14 is a laterally-projecting arm 18, the outer end of which carries a rectangular casing 19, through which the member 17 passes. A leaf-spring 20 is located upon the inner face of one of the upturned ends 15 of the plate 14, said spring 20 engaging with frictional contact against the edge of the member 1, thus offering the proper resistance to the movement of said plate 14 upon said member 1. Fixed to the outside of the upturned end 15 that carries this spring 20 is one end of a leaf-spring 21, the outer end of which bears against the edge of the measuring member 17 with frictional contact, thus offering a resistance to the movement of said measuring member 17 through the rectangular apertures 16 and the casing 19.

Fixed to the top of the casing 19 is one end of a leaf-spring 22, the point of which bears directly upon the top of the measuring member 17 at the point where the same crosses the main member 1.

The operation of my improved measuring instrument is obvious and will be readily understood by all persons familiar with the art to which it pertains. It is only necessary to move the measuring member in and out through the bearing 7 and upper end of the housing 5 to slide the plate 14 along the member 1 and to adjust the measuring member 17 through the casing 19 and apertures 16 in the upturned ends of said plate to obtain whatever measure it is desired.

The socket 10, carrying the measuring member 12, is readily placed in position upon or removed from the end of the measuring member 8, and by the proper manipulation and location of the measuring members heretofore described all of the distances, curves, and slopes of a person's body may be readily ascertained, said measurements being all obtained without the use of any flexible device, such as a tape-measure. If desired, a number of the sliding plates 14, carrying the sliding measuring members 17, may be located upon the main member 1, though I have found in practical use that all of the measurements required can be obtained by the use of one of said plates and measuring members 17.

A tailor's measure of my improved construction is simple, inexpensive, light and compact, can be folded into a comparatively small space, is expeditiously adjusted, and therefore can readily be applied for use.

I claim—

1. In a tailor's measure, an adjustable plate having integral upturned ends in which are formed rectangular apertures, a laterally-projecting arm formed integral with one of said upturned ends, a casing carried by the outer end of said arm, and leaf-springs carried by said plate and arm for engaging upon the measuring members which carry and are carried by said plate and arm.

2. In a tailor's measure, the main measuring member 1, the sockets 3 jointing the sections of said member together, the metallic housing 5 rigidly fixed upon the upper end of said measuring member 1, the laterally-projecting portion 6 extending at right angles to said member, the rectangular bearing 7 upon the outer end of said portion 6, the measuring member 8 arranged to slide in said bearing 7 and in the upper end of the housing 5 and at right angles to the main measuring member, the leaf-spring 9 fixed to the bearing 7 and having its free end extending into the upper end of the housing 5 and operating directly upon the edge of the member 8.

3. In a tailor's measure, the main measuring member 1, the sockets 3 jointing the sections of said member together, the metallic housing 5 rigidly fixed upon the upper end of said measuring member 1, the laterally-projecting portion 6 extending at right angles to said member, the rectangular bearing 7 upon the outer end of said portion 6, the measuring member 8 arranged to slide in said bearing 7 and in the upper end of the housing 5 and at right angles to the main measuring member, the leaf-spring 9 fixed to the bearing 7 and having its free end extending into the upper end of the housing 5 and operating directly upon the edge of the member 8, the rectangular metallic socket 10 designed to fit upon the end of said member 8, the rectangular casing 11 arranged and fixed at right angles to said socket 10, the measuring member 12 arranged to slide through said casing, the leaf-spring 13 fixed to the inside of the said casing 11 and arranged to have its ends bear upon the said measuring member 12.

4. In a tailor's measure, an adjustable plate having upturned ends in which are formed rectangular apertures, a laterally-projecting arm formed integral with one of said upturned ends, a casing carried by the outer end of said arm, leaf-springs carried by said plate and arm for engaging upon the measuring members which carry and are carried by said plate and arm, a measuring member sliding through said plate, the metallic housing 5 rigidly fixed upon the upper end of said measuring member 1, the laterally-projecting portion 6 extending at right angles to said member, the rectangular bearing 7 upon the outer end of said portion 6, the measuring member 8 arranged to slide in said bearing 7 and in the upper end of the housing 5 and at right angles to the main measuring member, the leaf-spring 9 fixed to the bearing 7 and having its free end extending into the upper end of the housing 5 and operating directly upon the edge of the member 8.

5. In a tailor's measure, an adjustable plate having upturned ends in which are formed rectangular apertures, a laterally-projecting arm formed integral with one of said upturned ends, a casing carried by the outer end of said arm, leaf-springs carried by said plate and arm for engaging upon the measuring members which carry and are carried by said plate and arm, a measuring member sliding through said plate, the metallic housing 5 rigidly fixed upon the upper end of said measuring member 1, the laterally-projecting portion 6 extending at right angles to said member, the rectangular bearing 7 upon the outer end of said portion 6, the measuring member 8 arranged to slide in said bearing 7 and in the upper end of the housing 5 and at right angles to the main measuring member, the leaf-spring 9 fixed to the bearing 7 and having its free end extending into the upper end of the housing 5 and operating directly upon the edge of the member 8, the rectangular metallic socket 10 designed to fit upon the end of said member 8, the rectangular casing 11 arranged and fixed at right angles to said socket 10, the measuring member 12 arranged to slide through said casing, the leaf-spring 13 fixed to the inside of the said casing 11 and arranged to have its ends bear upon the said measuring member 12.

In testimony whereof I affix my signature in presence of two witnesses.

ARCHER VAUGHN.

Witnesses:
   C. G. NAPIER,
   E. A. CREEL.